Dec. 4, 1956 Y. KAPLAN ET AL Re. 24,251

DISPENSING CONTAINERS FOR LIQUIDS

Original Filed Dec. 7, 1954

INVENTORS
YALE KAPLAN
HAROLD M. ROSS
BY Joseph W. Schofield
ATTORNEY

United States Patent Office

Re. 24,251
Reissued Dec. 4, 1956

24,251

DISPENSING CONTAINERS FOR LIQUIDS

Yale Kaplan, West Hartford, Conn., and Harold M. Ross, Plainfield, N. J., assignors of one-third to Hyman Bodner, Brooklyn, N. Y.

Original No. 2,707,581, dated May 3, 1955, Serial No. 473,523, December 7, 1954. Application for reissue May 11, 1956, Serial No. 584,407

3 Claims. (Cl. 222—107)

Matter enclosed in heavy brackets [ ] appears in the original patent but forms no part of this reissue specification; matter printed in italics indicates the additions made by reissue.

This invention relates to flexible dispensing containers for limited amounts of liquids, the containers being adapted for shipment in sealed condition and, after tearing off a strip along one end, may be used to dispense the liquid by the application of pressure.

This application is a continuation in part of Ser. No. 303,661 filed August 11, 1952.

A primary object of the invention is to provide a container for sauce or syrup, the quantity held by the container being sufficient for a single serving and the flow from the container being effected by squeezing or compressing the container; the container being so constructed and arranged that, when pressure is released, the flow of [fluid] *liquid* will stop and any possible leakage will be prevented. Repeated squeezing will dispense successive small amounts of the [fluid] *liquid* until the container is empty, when the container may be discarded.

Another object of the invention is to form the container from thin plastic material by sealing two sides and an end of the container, and, after filling the container with the desired quantity of the sauce or syrup, sealing the other end. One of the ends is sealed by a special die which provides a broad sealed portion with a narrow passage extending part way across the broad sealed portion and so constructed and arranged that, when part of said broad sealed portion has been torn away to open the narrow passage, the sauce or syrup may be dispensed by, and only by, squeezing or compressing the container.

These and other objects of the invention will be apparent from the following explanation in connection with the drawings in which—

Figure 1:
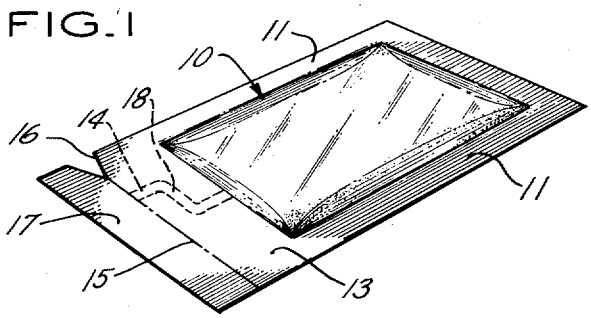
Fig. 1 is a perspective view of a flexible container made in accordance with the present invention.

Referring to the drawings in each of the modifications, container 10 is formed of two sheets of plastic material, the shaded areas 11 being sealed together to enclose liquid 12. One of the ends is sealed after filling the container.

Sealed end 13 is a broad area. Narrow passage 14 extends part way across broad area 13. Crease 15 and notch 16 may facilitate tearing off the strip 17 to open passage 14 and permit dispensing the liquid. Passage 14 is tortuous and includes transverse portion 18. Various forms of plastic material of various degrees of transparency, flexibility, thickness, and method of sealing may be used. The containers illustrated and described are shown as being formed of two sheets of material sealed together over the shaded areas. It is obvious that the container could be formed from a single strip of material folded longitudinally, or from a tube flattened and sealed at the ends only. In any case, the containers may be produced with one end left open for filling, and shipping unfilled in flat condition, the unsealed end being sealed after filling.

To dispense the liquid 12, the operator tears off strip 17 to open the end of passage 14, and then applies pressure to liquid 12 by squeezing or compressing the opposite faces of the container. It is obvious that, in any transverse portion 18 of passage 14, the two sheets of material will distort or spring apart when, and only when, pressure is applied, and thus permit the escape of [fluid] *liquid*. Upon release of pressure, in any transverse portion 18 of passage 14, the two sheets will tend to return to flat position and effectively prevent leakage. The tortuous passage 14 with its transverse portion 18 serves as a spring check valve and allows the [fluid] *liquid* to flow only by the application of pressure.

Figure 2:
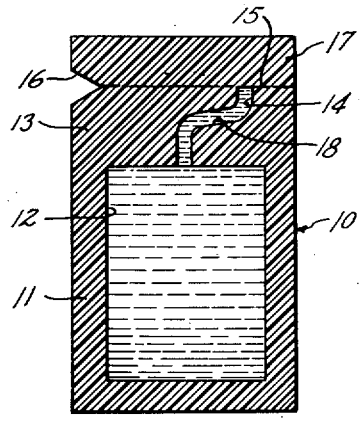
Fig. 2 is a plan view in section of one form of the invention.
Figure 3:
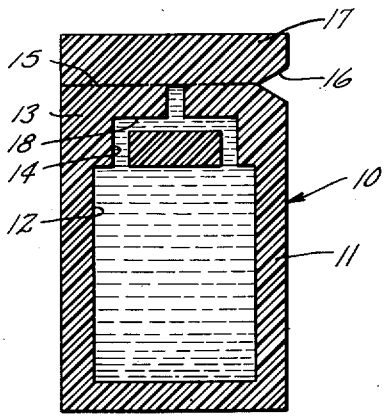
Fig. 3 is a plan view in section of a modification of the package shown in Figs. 1 and 2.
Figure 4:
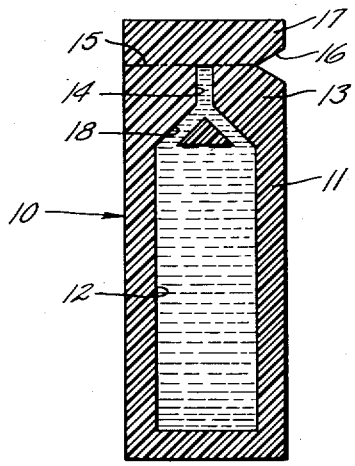
Fig. 4 is a plan view in section of another modification.
Figure 5:
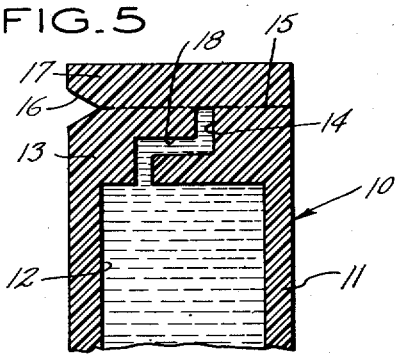
Fig. 5 is a plan view in section of a further modification.

As shown in Figs. 2 to 5, the tortuous passage 14 extending from the space within the container to the crease line 15 may take various forms. In each form of this passage there is a well defined transverse portion 18.

Having thus described the invention, it is apparent that the objects as stated have been attained in a simple and practical manner. It is understood that changes may be made in the structure and in the arrangement of the invention without departing from the spirit or scope of the following claims.

We claim:

1. A flexible [non-metallic] container for [fluids] *liquids* comprising two sheets of plastic material the edges of said sheets being sealed, one of said edges having a broad sealed area, a tortuous passage from within said container extending to *and terminating at* an intermediate part of said broad sealed area, said tortuous passage having a substantially transverse portion, said sealed area being severable at an intermediate point to open the outer end of said tortuous passage to permit dispensing said [fluid] *liquid* through said tortuous portion and from said passage only when pressure is applied to the opposite sides of said container to force said sheets apart in said transverse portion.

2. A flexible [non-metallic] container for [fluids] *liquids* comprising two sheets of plastic material the edges of said sheets being sealed, one of said edges having a broad sealed area, a passage from within said container [to] *terminating at* an intermediate part of said broad sealed area, said passage having a substantially transverse portion, said sealed area being severable at an intermediate point to open the outer end of said passage to permit dispensing said [fluid] *liquids* through said transverse portion and from said passage when pressure is applied to the opposite sides of said container sufficient to force said sheets apart in said transverse portion, said passage returning to flat condition to prevent leakage when pressure against the sides of the container is released.

*3. The combination comprising, a container for liquids formed of two portions of flexible plastic sheet material with a generally flat shaped cavity therebetween containing a body of liquid, said container being completely sealed about its periphery to retain said liquid against escape, at least one side of the periphery of said container including portions of said sheet material which form continuations of the side walls of said container and which are sealed together over a broad area, such broad sealing area of said extensions being interrupted to form a dispensing passage of tortuous shape having an intermediate portion extending substantially transversely of*

*the container, said passage extending from said cavity to and terminating at an intermediate point in said broad sealed area, a transverse portion of said broad area being readily severable from an outer edge thereof at least to said intermediate point whereby when said portion is severed said passage for discharge of said liquid is opened when sufficient pressure is applied to the container walls to cause separation of the passage walls, portions at least of the walls of the tortuous passage acting to come together again upon release of such pressure to check further dispensing of the liquid.*

References Cited in the file of this patent or the original patent

UNITED STATES PATENTS

| | | |
|---|---|---|
| 528,565 | Schwiebert | Nov. 6, 1894 |
| 1,765,114 | Turner | June 17, 1930 |
| 2,103,389 | Salfisberg | Dec. 28, 1937 |
| 2,361,344 | Yates | Oct. 24, 1944 |
| 2,517,027 | Rado | Aug. 1, 1950 |
| 2,605,896 | Rohdin | Aug. 5, 1952 |